US011552861B2

(12) United States Patent
Wang et al.

(10) Patent No.: US 11,552,861 B2
(45) Date of Patent: Jan. 10, 2023

(54) EFFICIENT WAY TO PERFORM LOCATION SLO VALIDATION

(71) Applicant: EMC IP Holding Company LLC, Hopkinton, MA (US)

(72) Inventors: Ren Wang, Shanghai (CN); Scott Quesnelle, Burlington (CA); Mengze Liao, Shanghai (CN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 294 days.

(21) Appl. No.: 16/509,321

(22) Filed: Jul. 11, 2019

(65) Prior Publication Data

US 2021/0014131 A1  Jan. 14, 2021

(51) Int. Cl.
| | | |
|---|---|---|
| *G06F 15/16* | (2006.01) | |
| *G06F 9/54* | (2006.01) | |
| *H04L 29/06* | (2006.01) | |
| *H04L 41/5009* | (2022.01) | |
| *H04L 41/50* | (2022.01) | |
| *H04L 41/5025* | (2022.01) | |
| *H04L 43/55* | (2022.01) | |

(52) U.S. Cl.
CPC ...... *H04L 41/5009* (2013.01); *H04L 41/5025* (2013.01); *H04L 41/5032* (2013.01); *H04L 43/55* (2022.05)

(58) Field of Classification Search
CPC ............ H04L 41/5025; H04L 41/5009; H04L 41/5032; H04L 12/24
USPC ...................................................... 707/652
See application file for complete search history.

(56) References Cited

U.S. PATENT DOCUMENTS

| | | | | |
|---|---|---|---|---|
| 8,959,312 | B2* | 2/2015 | Acharya | G06F 3/067 |
| | | | | 711/203 |
| 2007/0244939 | A1* | 10/2007 | Devarakonda | G06F 16/221 |
| 2009/0002370 | A1* | 1/2009 | Helfman | G06T 5/009 |
| | | | | 345/440 |
| 2013/0275656 | A1* | 10/2013 | Talagala | G06F 12/0246 |
| | | | | 711/103 |
| 2013/0346720 | A1* | 12/2013 | Colgrove | G06F 3/0641 |
| | | | | 711/165 |
| 2015/0269239 | A1* | 9/2015 | Swift | G06F 16/27 |
| | | | | 707/610 |
| 2016/0162370 | A1* | 6/2016 | Mehta | G06F 16/162 |
| | | | | 707/610 |
| 2017/0109283 | A1* | 4/2017 | Ash | G06F 11/0727 |

(Continued)

*Primary Examiner* — Hamza N Algibhah
(74) *Attorney, Agent, or Firm* — Womble Bond Dickinson (US) LLP

(57) ABSTRACT

A method, apparatus, and system for performing a Location SLO check based on a location scatter table is disclosed. A location scatter table is maintained, the location scatter table indicative of updated geographical location distribution of all backups of all assets. A Location Service Level Objective (SLO) associated with a first asset is determined, the Location SLO associated with the first asset specifying one or more allowed locations where backups of the first asset are permitted to be located. All locations where at least one backup of the first asset is located are determined. A Location SLO check for the first asset is performed, wherein the Location SLO check passes when all the locations where at least one backup of the first asset is located fall within the allowed locations specified by the Location SLO.

21 Claims, 7 Drawing Sheets

(56) References Cited

U.S. PATENT DOCUMENTS

| | | | |
|---|---|---|---|
| 2017/0206107 A1* | 7/2017 | Guha | G06F 3/0647 |
| 2017/0228417 A1* | 8/2017 | Maccanti | G06F 11/1469 |
| 2018/0316577 A1* | 11/2018 | Freeman | H04L 41/5009 |
| 2018/0324033 A1* | 11/2018 | Rath | G06F 11/2097 |

* cited by examiner

EFFICIENT WAY TO PERFORM LOCATION SLO VALIDATION

FIELD OF THE INVENTION

Embodiments of the present invention relate generally to data storage systems. More particularly, embodiments of the invention relate to managing location service level objectives.

BACKGROUND

EMC Enterprise Copy Data Management (eCDM) is used to protect enterprise assets such as virtual machine (VM) images, databases, and other files. It creates and manages backups of the assets. Backups are created regularly for assets, and may be placed at different geographical locations (e.g., different data centers). For example, a VM may be hosted in a datacenter in Seattle, but its backups may be stored in datacenters in Boston and Los Angeles to enhance the Disaster Recovery capability.

A security manager may create Service Level Agreements (SLAs), and associate them with assets. If an asset has an SLA attached thereto, all its backups need to comply with the corresponding SLA rules; otherwise, a warning may be issued. An SLA may comprise a number of Service Level Objectives (SLOs). One type of SLOs are known as Location SLOs. A Location SLO comprises a list of allowed locations. If any backup of an asset to which the Location SLO applies is placed in a location not on the list of allowed locations, the Location SLO check should fail.

For example, a Location SLO of [Shanghai, Beijing] applies to the asset with the asset identifier (ID) "asset-1." Accordingly, all backups of the asset with the asset ID of "asset-1" should be placed in either Shanghai or Beijing. If a backup of the asset is placed in Chengdu, the Location SLO check fails. Typically, SLA checks are performed every day, during which all SLOs are checked for all protected assets to which SLAs are attached.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Figure 1:
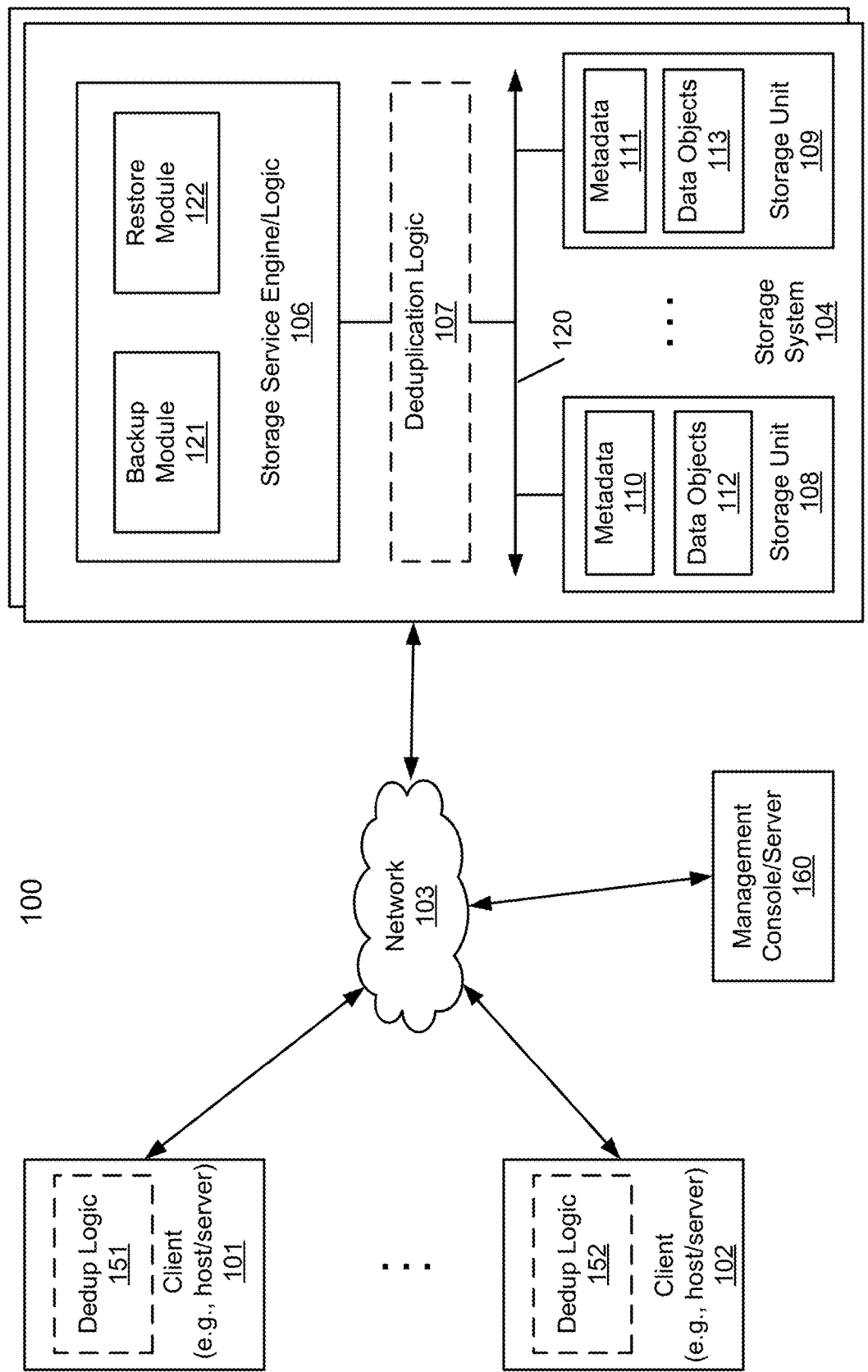
FIG. 1 is a block diagram illustrating a storage system according to one embodiment of the invention.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

A method, apparatus, and system for performing a Location SLO check based on a location scatter table is disclosed. A location scatter table is maintained, the location scatter table indicative of updated geographical location distribution of all backups of all assets. A Location Service Level Objective (SLO) associated with a first asset is determined, the Location SLO associated with the first asset specifying one or more allowed locations where backups of the first asset are permitted to be located. All locations where at least one backup of the first asset is located are determined. A Location SLO check for the first asset is performed, wherein the Location SLO check passes when all the locations where at least one backup of the first asset is located fall within the allowed locations specified by the Location SLO, and fails when at least one location where at least one backup of the first asset is located does not fall within the allowed locations.

In one embodiment, the location scatter table comprises a main hash table and one or more asset-specific key-value tables each of which is associated with one of the assets. The main hash table is a key-value table where keys of the main hash table correspond to identifiers of assets and values of the main hash table indicate respective asset-specific key-value tables associated with the respective assets. In each asset-specific key-value table, keys of the asset-specific key-value table correspond to locations where at least one backup of the associated asset is located, and values of the asset-specific key-value table indicate numbers of backups located at the respective locations.

In one embodiment, creation of a new backup of a second asset triggers a first update in the asset-specific key-value table associated with the second asset, the first update comprising incrementing the respective value by 1 when a key corresponding to a location of the new backup already exists, or creating a new key-value pair with the key corresponding to the location of the new backup and the value set to 1 when no key corresponding to the location of the new backup already exists.

In one embodiment, deletion of a backup of a third asset triggers a second update in the asset-specific key-value table associated with the third asset, the second update comprising decrementing a value in the respective key-value pair associated with a location of the deleted backup by 1, and when the value in the respective key-value pair reaches 0 after the decrement, the second update further comprising deleting the respective key-value pair associated with the location of the deleted backup from the asset-specific key-value table.

It should be appreciated that moving of a backup between two locations is equivalent to and handled in the same way as a combination of a creation of a new backup at the destination location and a deletion of the backup at the source location.

In one embodiment, the location scatter table is rebuilt, comprising querying all the backups of all the assets to obtain the updated geographical location distribution of all the backups of all the assets.

FIG. 1 is a block diagram illustrating a storage system according to one embodiment of the invention. Referring to FIG. 1, system 100 includes, but is not limited to, one or more client systems 101-102 communicatively coupled to storage system 104 over network 103. Clients 101-102 may be any type of clients such as a host or server, a personal computer (e.g., desktops, laptops, and tablets), a "thin" client, a personal digital assistant (PDA), a Web enabled appliance, or a mobile phone (e.g., Smartphone), etc. Alternatively, any of clients 101-102 may be a primary storage system (e.g., local data center) that provides storage to other local clients, which may periodically back up the content stored therein to a backup storage system (e.g., a disaster recovery site or system), such as storage system 104. Network 103 may be any type of networks such as a local area network (LAN), a wide area network (WAN) such as the Internet, a fiber network, a storage network, or a combination thereof, wired or wireless. Clients 101-102 may be in physical proximity or may be physically remote from one another. Storage system 104 may be located in proximity to one, both, or neither of clients 101-102.

Storage system 104 may include or represent any type of servers or a cluster of one or more servers (e.g., cloud servers). For example, storage system 104 may be a storage server used for various different purposes, such as to provide multiple users or client systems with access to shared data and/or to back up (or restore) data (e.g., mission critical data). Storage system 104 may provide storage services to clients or users via a variety of access interfaces and/or protocols such as file-based access protocols and block-based access protocols. The file-based access protocols may include the network file system (NFS) protocol, common Internet file system (CIFS) protocol, and direct access file system protocol, etc. The block-based access protocols may include the small computer system interface (SCSI) protocols, Internet SCSI or iSCSI, and Fibre channel (FC) protocol, etc. Storage system 104 may further provide storage services via an object-based protocol and Hadoop distributed file system (HDFS) protocol.

In one embodiment, storage system 104 includes, but is not limited to, storage service engine 106 (also referred to as service logic, service module, or service unit, which may be implemented in software, hardware, or a combination thereof), optional deduplication logic 107, and one or more storage units or devices 108-109 communicatively coupled to each other. Storage service engine 106 may represent any storage service related components configured or adapted to provide storage services (e.g., storage as a service) to a variety of clients using any of the access protocols set forth above. For example, storage service engine 106 may include backup logic 121 and restore logic 122. Backup logic 121 is configured to receive and back up data from a client (e.g., clients 101-102) and to store the backup data in any one or more of storage units 108-109. Restore logic 122 is configured to retrieve and restore backup data from any one or more of storage units 108-109 back to a client (e.g., clients 101-102).

Storage units 108-109 may be implemented locally (e.g., single node operating environment) or remotely (e.g., multi-node operating environment) via interconnect 120, which may be a bus and/or a network (e.g., a storage network or a network similar to network 103). Storage units 108-109 may include a single storage device such as a hard disk, a tape drive, a semiconductor memory, multiple storage devices such as a redundant array system (e.g., a redundant array of independent disks (RAID)), a system for storage such as a library system or network attached storage system, or any other appropriate storage device or system. Some of storage units 108-109 may be located locally or remotely accessible over a network.

In response to a data file to be stored in storage units 108-109, according to one embodiment, deduplication logic 107 is configured to segment the data file into multiple segments (also referred to as chunks) according to a variety of segmentation policies or rules. Deduplication logic 107 may choose not to store a segment in a storage unit if the segment has been previously stored in the storage unit. In the event that deduplication logic 107 chooses not to store the segment in the storage unit, it stores metadata enabling the reconstruction of the file using the previously stored segment. As a result, segments of data files are stored in a deduplicated manner, either within each of storage units 108-109 or across at least some of storage units 108-109. The metadata, such as metadata 110-111, may be stored in at least some of storage units 108-109, such that files can be accessed independent of another storage unit. Metadata of each storage unit includes enough information to provide access to the files it contains.

In one embodiment, referring back to FIG. 1, any of clients 101-102 may further include an optional deduplication logic (e.g., deduplication logic 151-152) having at least a portion of functionalities of deduplication logic 107. Deduplication logic 151-152 are configured to perform local deduplication operations, respectively. For example, prior to transmit data to storage system 104, each of the deduplication logic 151-152 may deduplicate the data into deduplicated segments and determine whether a particular deduplicated segment has already been stored in storage system 104. A deduplicated segment is transmitted to storage system 104 only if the deduplicated segment has not been stored in storage system 104.

For example, when client 101 is about to transmit a data stream (e.g., a file or a directory of one or more files) to storage system 104, deduplication logic 151 is configured to deduplicate the data stream into deduplicated segments. For each of the deduplicated segments, client 101 transmits a fingerprint or representative of the deduplicated segment to storage system 104 to determine whether that particular deduplicated segment has already been stored in storage system 104. A deduplicated segment that has been stored in storage system 104 may be previously received from the same client 101 or from another client such as client 102. In response to a response from storage system 104 indicating that the segment has not been stored in storage system 104, that particular segment is then transmitted over to the storage system 104. As a result, the network traffic or bandwidth and the processing resources required can be greatly reduced.

In one embodiment, storage system 104 further includes a storage manager or storage controller (not shown) configured to manage storage resources of storage system 104, such as, for example, storage space and processing resources (e.g., processor, memory, network resources). The storage manager or controller may be accessed by an administrator of management console or server 160 remotely via a management or configuration interface (not shown). The administrator can provision and manage storage resources based on a set of policies, rules, and/or service level agreements. The storage resources may be virtualized into a pool of virtual storage resources, where underlying physical storage resources represented by the corresponding virtual storage resources may be implemented locally, remotely (e.g., hosted by another storage system), or both. The virtual storage resources can be provisioned, allocated, and/or defined by an administrator or automatically by the storage manager based on a set of software-defined policies. The virtual storage resources may be represented in one or more virtual machines (e.g., virtual storage systems) managed by one or more virtual machine managers (VMMs). Each of the virtual machines can be provisioned to provide a particular type of storage services (e.g., file-based, block-based, object-based, or RDFS) to a client based on a storage policy or service level agreement associated with that particular client as part of software-defined storage services.

Figure 2:
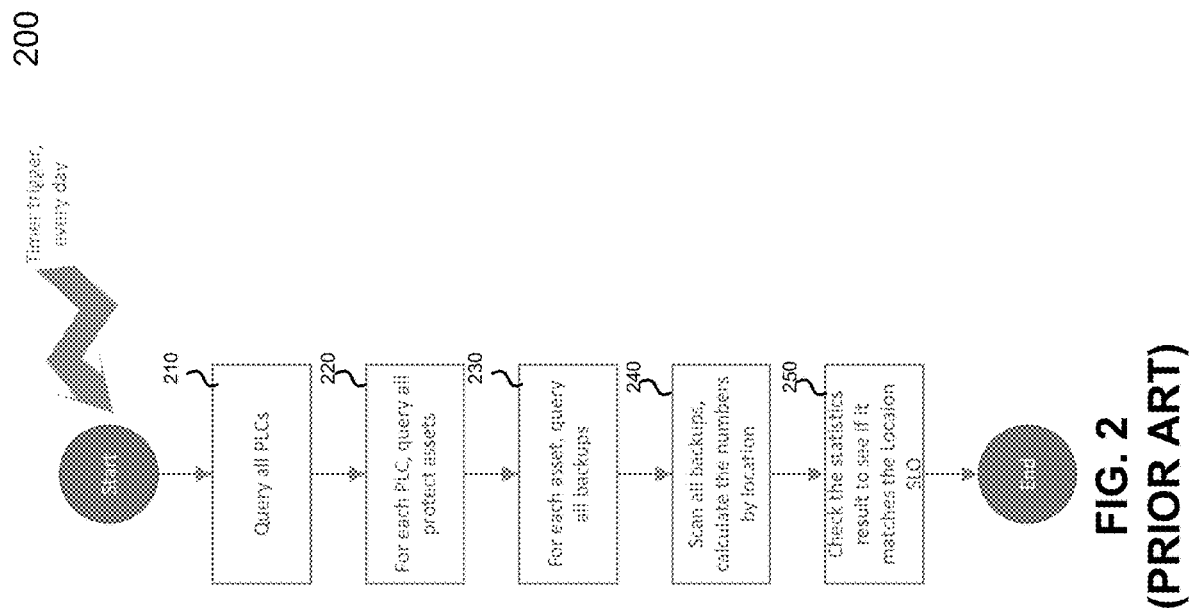
FIG. 2 is a flowchart illustrating a prior art method for performing a Location SLO check.

Referring to FIG. 2, a flowchart illustrating a prior art method 200 for performing a Location SLO check is shown. Process 200 may be triggered automatically every day, for example, at 2:00 AM UTC. At block 210, all Protection Life Cycle definitions (PLCs) are retrieved and queried. A PLC defines the relationship between one or more protected assets and the SLAs attached thereto. At block 220, for each PLC, all assets are queried to obtain the associated SLAs. For example, an asset list of [asset-1, asset-2, asset-3] may be obtained by querying a PLC, and a Location SLO of [Shanghai, Beijing] is found to be associated with each of the assets on the asset list. At block 230, for each asset, information about all backups of the asset is obtained. For example, a query of the backups of the asset with the ID "asset-1" returns the backup list of [backup-1 in Shanghai, backup-2 in Beijing, backup-3 in Chengdu, backup-4 in Shanghai] (it should be appreciated that "backup-1" through "backup-4" are backup IDs). At block 240, all locations where at least one backup of the asset is located are determined, and the number of backups at each of the locations may also be determined. In this example, it can be determined that for the asset with the asset ID "asset-1", two (2) backups (with IDs "backup-1" and "backup-4") are located in Shanghai, one (1) backup (with ID "backup-2") is located in Beijing, and (1) backup (with ID "backup-3") is located in Chengdu. At block 250, the list of all locations where at least one backup is located is compared against the Location SLO associated with the asset. The Location SLO check fails for the asset if one or more locations where at least one backup is located do not fall within the allowed locations specified by the Location LSO, and passes only when all locations where at least one backup is located are allowed locations as specified by the Location SLO. In the present example, the Location SLO check fails for the asset (with ID "asset-1") because Chengdu, where one (1) backup is located, is not an allowed location as specified by the Location SLO. The Location SLO check is performed for all assets contained in all PLCs.

The existing method for performing the Location SLO check described above is straightforward, and works well when the number of assets and backups is small. However, this existing method does not scale well as the number of assets and backups increases. For a long time client that has thousands of protected assets, each of which can have thousands of backups, the existing method is associated with poor performance because querying a large number of backups is very time consuming. Because the SLA check is performed every day, a more efficient method for performing the Location SLO check is desired.

Figure 3:
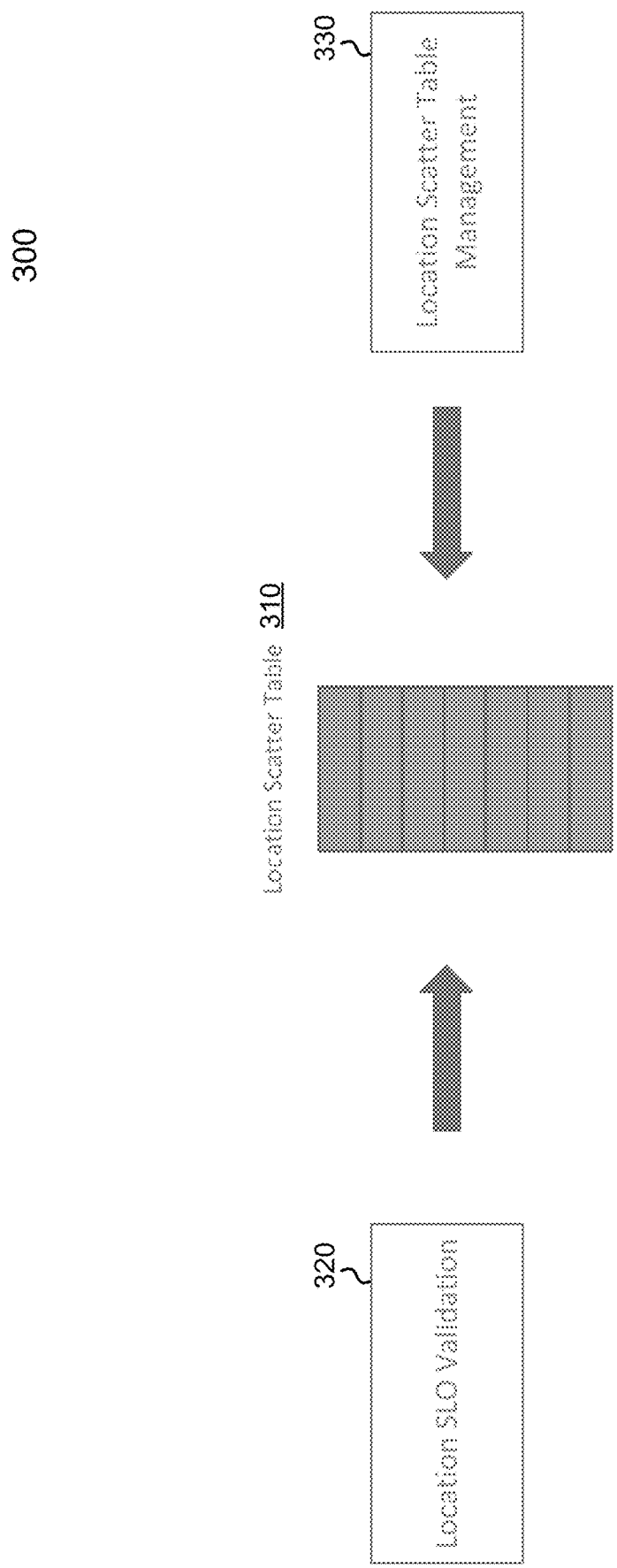
FIG. 3 is a block diagram illustrating various components utilized in embodiments of the disclosure.

Referring to FIG. 3, a block diagram 300 illustrating various components utilized in embodiments of the disclosure is shown. A location scatter table 310 has stored therein location distribution information for all backups of all the protected assets. A Location SLO validation module 320 performs Location SLO checks using the location scatter table 310. The new method for performing Location SLO checks according to embodiments is highly efficient, and delivers great performance improvements over the existing method. A location scatter table management module 330 maintains and updates the location scatter table 310 based on events associated with the backups.

Figure 4:
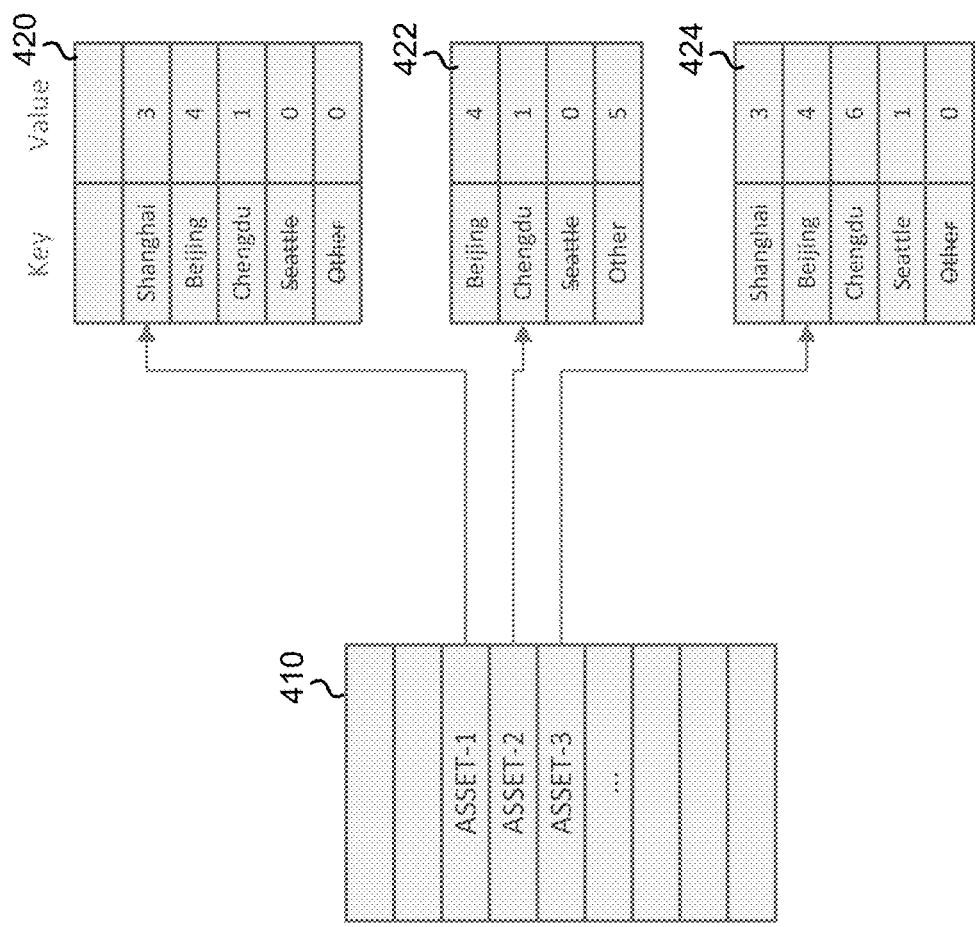
FIG. 4 is a block diagram illustrating an example location scatter table according to one embodiment.

Referring to FIG. 4, a block diagram illustrating an example location scatter table 400 according to one embodiment is shown. The location scatter table 400 contains, for each protected asset, the locations where at least one backup is located and the number of backups located at each of the locations. As shown in FIG. 4, the location scatter table 400 comprises a main hash table 410 and one or more asset-specific key-value tables 420, 422, 424. The main hash table 410 is a key-value table where the keys correspond to asset IDs, and the associated values point to respective asset-specific key-value tables 420, 422, 424. Therefore, each protected asset has a key-value pair entry in the main hash table 410, and is associated with its respective asset-specific key-value table. In an asset-specific key-value table, the keys correspond to locations where at least one backup of the asset is located, and the associated values indicate, respectively, the number of backups located at the locations.

Therefore, as shown in FIG. 4, the asset with the ID "asset-1" has three (3) backups located in Shanghai, four (4) backups located in Beijing, and one (1) backup located in Chengdu. The asset with the ID "asset-2" has four (4) backups located in Beijing, one (1) backup located in Chengdu, and five (5) backups located elsewhere. Further, the asset with the ID "asset-3" has three (3) backups located in Shanghai, four (4) backups located in Beijing, six (6) backups located in Chengdu, and one (1) backup located in Seattle.

The location scatter table 400 is kept updated to reflect the latest backup geographical distribution as the backups are created, deleted, or moved. Performing the Location SLO check based on the location scatter table 400 is fast and efficient because for each protected asset, the locations where at least one backup is located can be directly retrieved without performing the time-consuming querying of the backups.

When a backup is created, the location scatter table management module is triggered by the backup creation event to update the location scatter table. In particular, the relevant asset-specific key-value table is located based on the main hash table. In the asset-specific key-value table, if a key-value pair already exists for the location of the new backup, the corresponding value is incremented by 1. If a key-value pair does not already exist for the location of the new backup, a new key-value pair is created, where the key is the location of the new backup, and the value is set to 1.

When a backup is deleted, the location scatter table management module is triggered by the backup deletion event to update the location scatter table. In particular, the relevant asset-specific key-value table is located based on the main hash table. In the asset-specific key-value table, the value of the key-value pair associated with the location of the deleted backup is decremented by 1. If the value then becomes 0, the key-value pair is deleted from the asset-specific key-value table.

When a backup is moved between locations, the location scatter table management module is triggered by the backup moving event to update the location scatter table. The moving of a backup is equivalent to a combination of a creation of a new backup at the destination location and a deletion of the backup at the source location. Accordingly, the location scatter table can be updated, comprising a first update reflecting the creation of a new backup at the destination location, and a second update reflecting the deletion of the backup at the source location.

In some rare circumstances such as when errors are encountered, a rebuilding of the location scatter table can be manually triggered. All the backups are then scanned and queries to obtain the necessary information for rebuilding the location scatter table.

Figure 5:
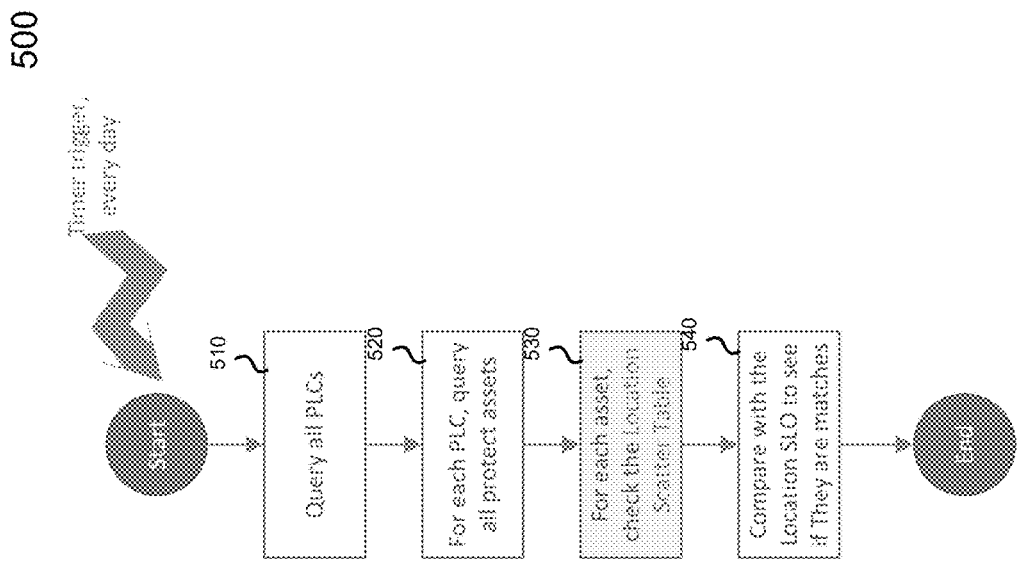
FIG. 5 is a flowchart illustrating an example method for performing a Location SLO check based on a location scatter table according to one embodiment.

Referring to FIG. 5, a flowchart illustrating an example method 500 for performing a Location SLO check based on a location scatter table according to one embodiment is shown. Process 500 can be triggered every day, e.g., at 2:00 AM UTC. At block 510, all Protection Life Cycle definitions (PLCs) are retrieved and queried. At block 520, for each PLC, all assets are queried to obtain the associated SLAs. For example, an asset list of [asset-1, asset-2, asset-3] may be obtained by querying a PLC, and a Location SLO of [Shanghai, Beijing] is found to be associated with each of the assets on the asset list. At block 530, all locations where at least one backup of a particular asset is located are determined based on the location scatter table, in particular, the asset-specific key-value table associated with the particular asset, where the locations correspond to the keys in the asset-specific key-value table. The number of backups at each of the locations may also be determined based on the location scatter table, in particular, the asset-specific key-value table associated with the particular asset. In this example, it can be determined that for the asset with the asset ID "asset-1," two (2) backups are located in Shanghai, one (1) backup is located in Beijing, and (1) backup is located in Chengdu.

At block 540, the list of all locations where at least one backup is located is compared against the Location SLO associated with the asset. The Location SLO check fails for the asset if one or more locations where at least one backup is located do not fall within the allowed locations specified by the Location LSO, and passes only when all locations where at least one backup is located are allowed locations as specified by the Location SLO. Represented in a different but equivalent way, the Location LSO check fails when the difference set C=A \ B is not an empty set, where A is the set that comprises all locations where at least one backup of a particular asset is located (i.e., all the keys in the corresponding asset-specific key-value table), and B is the set that comprises all the allowed location for the asset as specified by the location SLO. The Location SLO check passes when the difference set C=A \B is an empty set.

In the present example, the Location SLO check fails for the asset (with ID "asset-1") because Chengdu, where one (1) backup is located, is not an allowed location as specified by the Location SLO (in other words, the difference set C=A \ B comprises Chengdu and therefore is not an empty set). The Location SLO check is performed for all assets contained in all PLCs.

Figure 6:
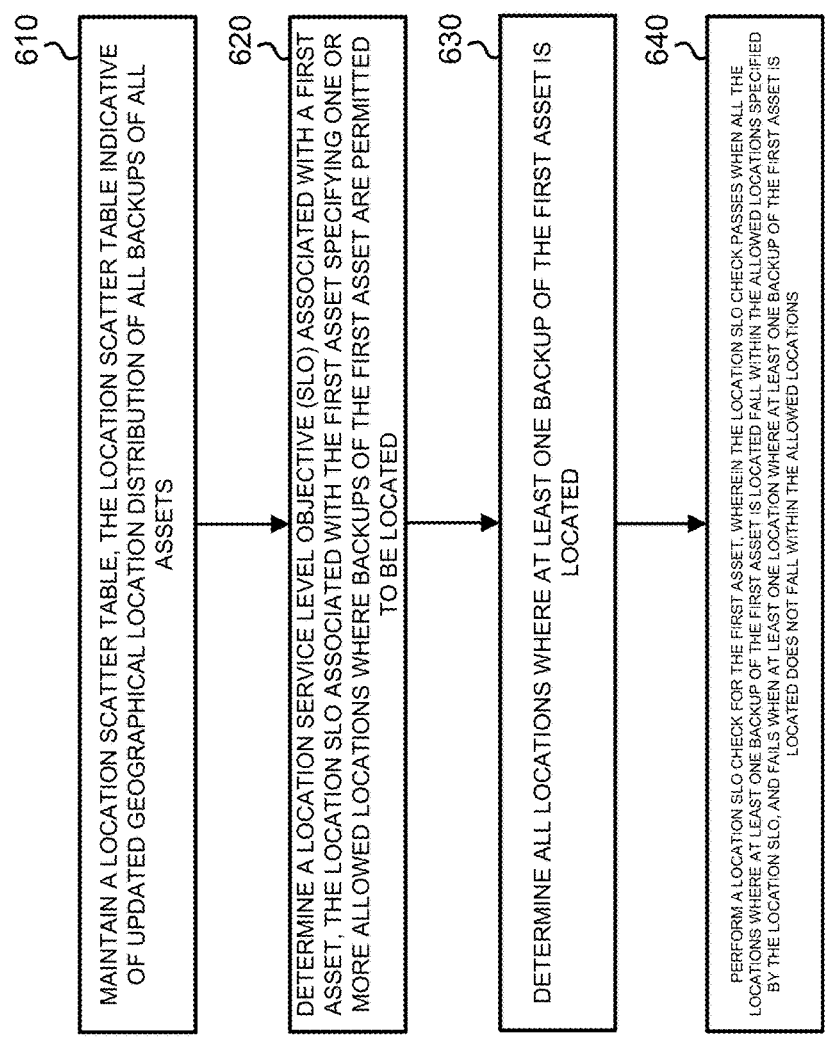
FIG. 6 is a flow diagram illustrating a process for performing a Location SLO check based on a location scatter table according to one embodiment of the disclosure.

FIG. 6 is a flow diagram illustrating a process 600 for performing a Location SLO check based on a location scatter table according to one embodiment of the disclosure. Process 600 may be performed by processing logic that includes hardware (e.g. circuitry, dedicated logic, etc.), software (e.g., embodied on a non-transitory computer readable medium), or a combination thereof. For example, process 600 may be performed by processor(s) 1501 of FIG. 7. Referring to FIG. 6, at block 610, a location scatter table is maintained, the location scatter table indicative of updated geographical location distribution of all backups of all assets. At block 620, a Location Service Level Objective (SLO) associated with a first asset is determined, the Location SLO associated with the first asset specifying one or more allowed locations where backups of the first asset are permitted to be located. At block 630, all locations where at least one backup of the first asset is located are determined. At block 640, a Location SLO check for the first asset is performed, wherein the Location SLO check passes when all the locations where at least one backup of the first asset is located fall within the allowed locations specified by the Location SLO, and fails when at least one location where at least one backup of the first asset is located does not fall within the allowed locations.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 7:
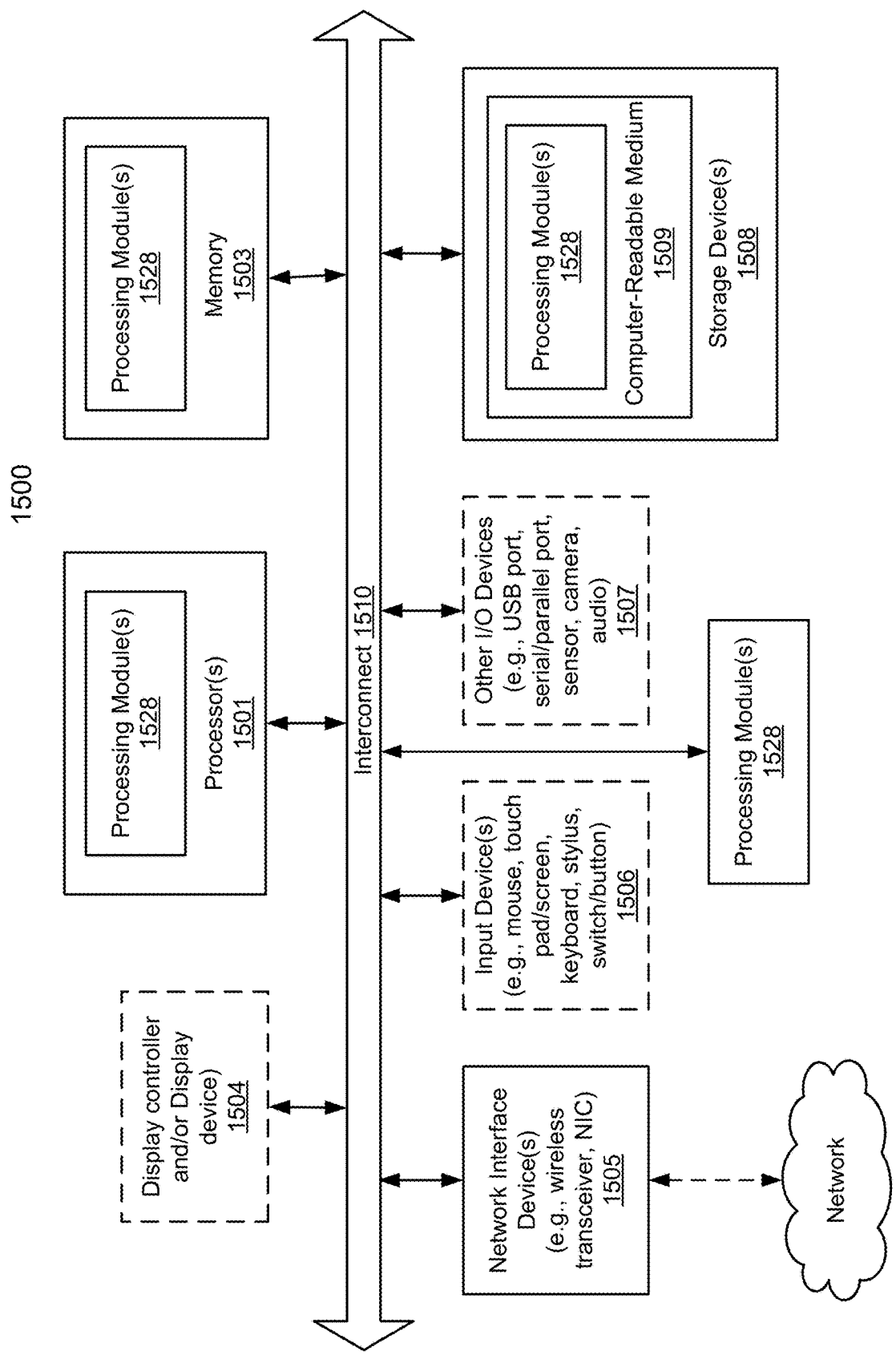
FIG. 7 is a block diagram illustrating a data processing system according to one embodiment.

FIG. 7 is a block diagram illustrating an example of a data processing system which may be used with one embodiment of the invention. For example, system 1500 may represents any of data processing systems described above performing any of the processes or methods described above. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Windows operating system from Microsoft®, Mac OS®/iOS® from Apple, Android® from Google®, Linux®, Unix®, or other real-time or embedded operating systems such as VxWorks.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including a basic input/output software (BIOS) as well as other firmware of the system.

Storage device 1508 may include computer-accessible storage medium 1509 (also known as a machine-readable storage medium or a computer-readable medium) on which is stored one or more sets of instructions or software (e.g., processing module, unit, and/or logic 1528) embodying any one or more of the methodologies or functions described herein. Processing module/unit/logic 1528 may represent any of the components described above, such as, for example, a storage service logic, a deduplication engine, a Location SLO validation module, a location scatter table management module, as described above. Processing module/unit/logic 1528 may also reside, completely or at least partially, within memory 1503 and/or within processor 1501 during execution thereof by data processing system 1500, memory 1503 and processor 1501 also constituting machine-accessible storage media. Processing module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Processing module/unit/logic 1528, components and other features described herein can be implemented as discrete hardware components or integrated in the functionality of hardware components such as ASICS, FPGAs, DSPs or similar devices. In addition, processing module/unit/logic 1528 can be implemented as firmware or functional circuitry within hardware devices. Further, processing module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

Therefore, embodiments of the disclosure relate to maintain a location scatter table to store geographical location distribution of all backups and all assets, and using the location scatter table to perform Location SLO checks. The location scatter table is updated in real time as operations on the backups are performed. Therefore, the performance of the Location SLO check can be greatly improved as full querying of all the backups can be avoided at the time the Location SLO check is performed.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method, comprising:
maintaining a location scatter table, the location scatter table indicative of updated geographical location distribution of all backups of all assets, the updated geographical location distribution indicating geographic locations associated with a portion of the backups and that geographic locations for a second portion of the backups is not indicated by the location scatter table;
determining a Location Service Level Objective (SLO) associated with a first asset of the all assets, the Location SLO being associated with the first asset and specifying one or more allowed geographic locations where backups of the first asset are permitted to be stored with one or more computing devices positioned in the allowed geographic locations;
determining, using the location scatter table, all geographic locations where at least one backup of the first asset is stored in one or more of the computing devices;
performing a Location SLO check for the first asset, wherein the Location SLO check passes when the all geographic locations, where the at least one backup of the first asset is stored in one or more of the computing devices, fall within the allowed geographic locations specified by the Location SLO, and fails when at least one geographic location, of the geographic locations where the at least one backup of the first asset is stored in one or more of the computing devices, does not fall within the allowed geographic locations.

2. The method of claim 1, wherein the location scatter table comprises a main hash table and one or more asset-specific key-value tables each of which is associated with one of the assets.

3. The method of claim 2, wherein the main hash table is a key-value table where keys of the main hash table correspond to identifiers of assets and values of the main hash table indicate respective asset-specific key-value tables associated with the respective assets, wherein each respective asset-specific key-value table lists, for each geographic location, a quantity of copies of a backup of an asset of the assets associated with the respective asset-specific key-value table.

4. The method of claim 2, wherein in each asset-specific key-value table, keys of the asset-specific key-value table correspond to geographic locations where at least one backup of the associated asset is located, and values of the asset-specific key-value table indicate numbers of backups located at the respective geographic locations.

5. The method of claim 4, wherein creation of a new backup of a second asset triggers a first update in the asset-specific key-value table associated with the second asset, the first update comprising incrementing the respective value by 1 when a key corresponding to a geographic location of the new backup already exists, or creating a new key-value pair with the key corresponding to the geographic location of the new backup and the value set to 1 when no key corresponding to the geographic location of the new backup already exists.

6. The method of claim 5, wherein deletion of a backup of a third asset triggers a second update in the asset-specific key-value table associated with the third asset, the second update comprising decrementing a value in the respective key-value pair associated with a geographic location of the deleted backup by 1, and when the value in the respective key-value pair reaches 0 after the decrement, the second update further comprising deleting the respective key-value pair associated with the geographic location of the deleted backup from the asset-specific key-value table.

7. The method of claim 1, wherein the geographical location distribution specifies geographic regions in which the backups of all assets are stored on the one or more computing devices, wherein the computing devices are geographically distributed across the geographic regions and the geographic regions are specified, at least in part, with names of cities in which portions of the computing devices in which the portion of the backups are stored are positioned and an indicator that locations of where the second portion of the backups are positioned in which other portions of the computing devices are positioned are unknown.

8. A non-transitory machine-readable medium having instructions stored therein, which when executed by a processor, cause the processor to perform data storage operations, the operations comprising:

maintaining a location scatter table, the location scatter table indicative of updated geographical location distribution of all backups of all assets, the updated geographical location distribution indicating geographic locations associated with a portion of the backups and that geographic locations for a second portion of the backups is not indicated by the location scatter table;

determining a Location Service Level Objective (SLO) associated with a first asset of the all assets, the Location SLO being associated with the first asset specifying one or more allowed geographic locations where backups of the first asset are permitted to be stored with one or more computing devices positioned in the allowed geographic locations;

determining, using the location scatter table, all geographic locations where at least one backup of the first asset is stored in one or more of the computing devices;

performing a Location SLO check for the first asset, wherein the Location SLO check passes when the all geographic locations, where the at least one backup of the first asset is stored in one or more of the computing devices, fall within the allowed geographic locations specified by the Location SLO, and fails when at least one geographic location, of the geographic locations where the at least one backup of the first asset is stored in one or more of the computing devices, does not fall within the allowed geographic locations.

9. The non-transitory machine-readable medium of claim 8, wherein the location scatter table comprises a main hash table and one or more asset-specific key-value tables each of which is associated with one of the assets.

10. The non-transitory machine-readable medium of claim 9, wherein the main hash table is a key-value table where keys of the main hash table correspond to identifiers of assets and values of the main hash table indicate respective asset-specific key-value tables associated with the respective assets, wherein each respective asset-specific key-value table lists, for each geographic location, a quantity of copies of a backup of an asset of the assets associated with the respective asset-specific key-value table.

11. The non-transitory machine-readable medium of claim 9, wherein in each asset-specific key-value table, keys of the asset-specific key-value table correspond to geographic locations where at least one backup of the associated asset is located, and values of the asset-specific key-value table indicate numbers of backups located at the respective geographic locations.

12. The non-transitory machine-readable medium of claim 11, wherein creation of a new backup of a second asset triggers a first update in the asset-specific key-value table associated with the second asset, the first update comprising incrementing the respective value by 1 when a key corresponding to a geographic location of the new backup already exists, or creating a new key-value pair with the key corresponding to the geographic location of the new backup and the value set to 1 when no key corresponding to the geographic location of the new backup already exists.

13. The non-transitory machine-readable medium of claim 12, wherein deletion of a backup of a third asset triggers a second update in the asset-specific key-value table associated with the third asset, the second update comprising decrementing a value in the respective key-value pair associated with a geographic location of the deleted backup by 1, and when the value in the respective key-value pair reaches 0 after the decrement, the second update further comprising deleting the respective key-value pair associated with the geographic location of the deleted backup from the asset-specific key-value table.

14. The non-transitory machine-readable medium of claim 8, wherein the geographical location distribution specifies geographic regions in which the backups of all assets are stored on the one or more computing devices, wherein the computing devices are geographically distributed across the geographic regions and the geographic regions are specified, at least in part, with names of cities in which portions of the computing devices in which the portion of the backups are stored are positioned and an indicator that locations of where the second portion of the backups are positioned in which other portions of the computing devices are positioned are unknown.

15. A data processing system, comprising:
a processor; and
a memory coupled to the processor to store instructions, which when executed by the processor, cause the processor to perform data storage operations, the operations including:
maintaining a location scatter table, the location scatter table indicative of updated geographical location distribution of all backups of all assets, the updated geographical location distribution indicating geographic locations associated with a portion of the backups and that geographic locations for a second portion of the backups is not indicated by the location scatter table;

determining a Location Service Level Objective (SLO) associated with a first asset of the all assets, the Location SLO being associated with the first asset and specifying one or more allowed locations where backups of the first asset are permitted to be stored with one or more computing devices positioned in the allowed geographic locations;

determining, using the location scatter table, all geographic locations where at least one backup of the first asset is stored in one or more of the computing devices;

performing a Location SLO check for the first asset, wherein the Location SLO check passes when the all geographic locations, where at least one backup of the first asset is stored in one or more of the computing devices, fall within the allowed geographic locations specified by the Location SLO, and fails when at least one geographic location, of the geographic locations where the at least one backup of the first asset is stored in one or more of the computing devices, does not fall within the allowed locations.

16. The data processing system of claim 15, wherein the location scatter table comprises a main hash table and one or more asset-specific key-value tables each of which is associated with one of the assets.

17. The data processing system of claim 16, wherein the main hash table is a key-value table where keys of the main hash table correspond to identifiers of assets and values of the main hash table indicate respective asset-specific key-value tables associated with the respective assets, wherein each respective asset-specific key-value table lists, for each geographic location, a quantity of copies of a backup of an asset of the assets associated with the respective asset-specific key-value table.

18. The data processing system of claim 16, wherein in each asset-specific key-value table, keys of the asset-specific key-value table correspond to geographic locations where at least one backup of the associated asset is located, and values of the asset-specific key-value table indicate numbers of backups located at the respective geographic locations.

19. The data processing system of claim 18, wherein creation of a new backup of a second asset triggers a first update in the asset-specific key-value table associated with the second asset, the first update comprising incrementing the respective value by 1 when a key corresponding to a geographic location of the new backup already exists, or creating a new key-value pair with the key corresponding to the geographic location of the new backup and the value set to 1 when no key corresponding to the geographic location of the new backup already exists.

20. The data processing system of claim 19, wherein deletion of a backup of a third asset triggers a second update in the asset-specific key-value table associated with the third asset, the second update comprising decrementing a value in the respective key-value pair associated with a geographic location of the deleted backup by 1, and when the value in the respective key-value pair reaches 0 after the decrement, the second update further comprising deleting the respective key-value pair associated with the geographic location of the deleted backup from the asset-specific key-value table.

21. The data processing system of claim 15, wherein the geographical location distribution specifies geographic regions in which the backups of all assets are stored on the one or more computing devices, wherein the computing devices are geographically distributed across the geographic regions and the geographic regions are specified, at least in part, with names of cities in which portions of the computing devices in which the portion of the backups are stored are positioned and an indicator that locations of where the second portion of the backups are positioned in which other portions of the computing devices are positioned are unknown.

\* \* \* \* \*